Nov. 17, 1964   W. HEYWANG ETAL   3,157,541
PRECIPITATING HIGHLY PURE COMPACT SILICON CARBIDE UPON CARRIERS
Filed Sept. 25, 1959   2 Sheets-Sheet 2
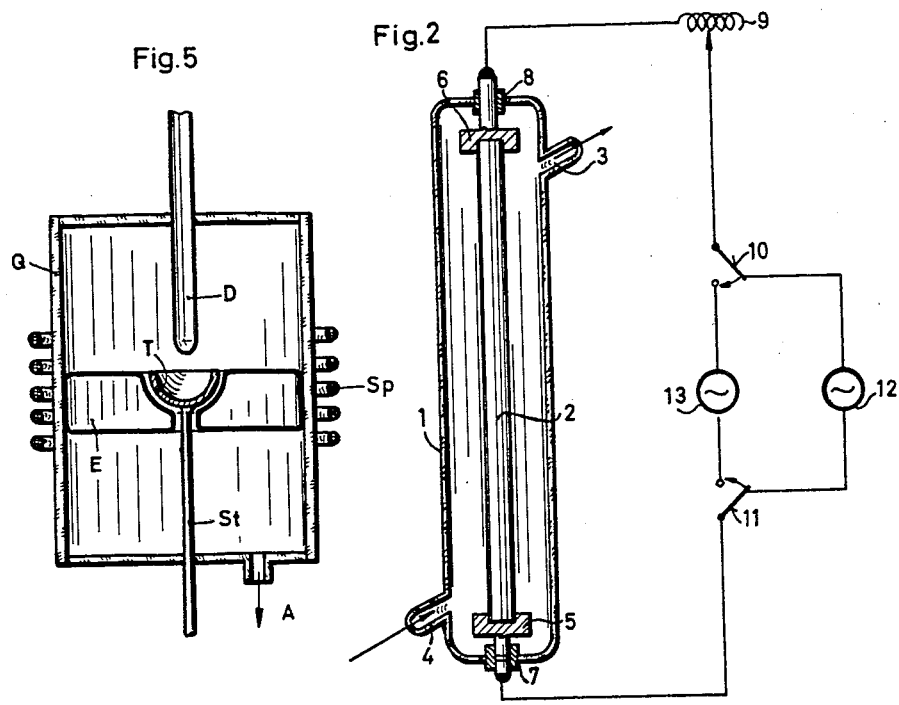
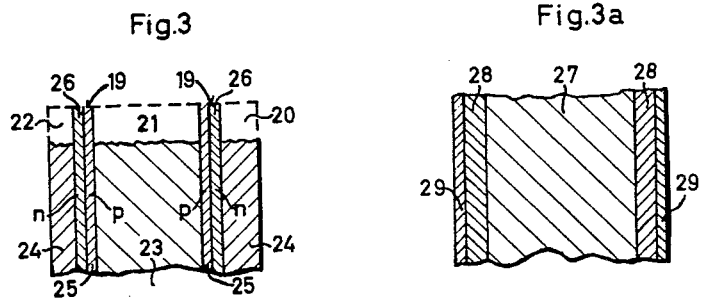
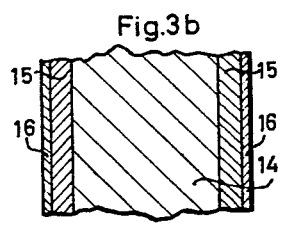
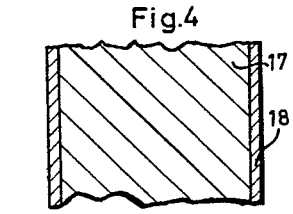

United States Patent Office 3,157,541
Patented Nov. 17, 1964

3,157,541
PRECIPITATING HIGHLY PURE COMPACT
SILICON CARBIDE UPON CARRIERS
Walter Heywang and Erhard Sirtl, both of Munich, and Rudolf Kappelmeyer, Heufeld-Waldheim, Germany, assignors to Siemens & Halske Aktiengesellschaft Berlin and Munich, a corporation of Germany
Filed Sept. 25, 1959, Ser. No. 842,495
Claims priority, application Germany Oct. 23, 1958
15 Claims. (Cl. 148—174)

This invention is concerned with separating from a gaseous phase highly pure silicon carbide and precipitating or depositing it in compact form on a suitable carrier body.

It is in connection with semiconductor arrangements to be used at relatively high temperatures desirable to employ a semi-conductor material the intrinsic conductivity of which acts in disturbing manner only at temperatures lying above the working temperature. Silicon and silicon carbide are such materials. Insufficient purity and difficulties connected with commercially available grades of these materials were until now against the use thereof for semiconductor purposes.

It is known that commercially obtainable pure silicon carbide can at very high temperatures (exceeding 2500° C.) be resublimated to mono crystals, the so-called α-silicon carbide. Methods are also known for producing highly pure silicon carbide by thermal decomposition of a highly pure gaseous silicon compound together with gaseous hydrocarbon substances, resulting in a relatively loose conglomeration of small pure crystals as so-called β-silicon carbide by common decomposition of silicon tetrachloride and hydrocarbon substances in a hydrogen stream.

The great disadvantages of these methods are that they require relatively high working temperatures and that the silicon carbide is not precipitated in compact definable form.

In the method suggested by the invention, a gaseous silicon compound and/or hydrocarbon compound is caused to stream past a carrier and is thermally decomposed upon such carrier. The surface temperature $T$ of the carrier thereby lies above about 1150° C. (formation threshold of the silicon carbide), especially, however, below the melting point of the silicon (about 1430° C.). The surface temperature $T$ of the carrier, particularly in the decomposition of a gaseous mixture of a silicon compound and a hydrocarbon compound, is held so high above the formation threshold of the silicon carbide and the ratio of silicon to hydrocarbon in the initial gaseous mixture is so adjusted that the amount of precipitated silicon is at the working temperature $T$ stoichiometrically equal to that of the hydrocarbon. In this method, the silicon carbide is accordingly deposited upon a carrier in compact form and defined layer thickness.

Due to the use of the corresponding initial compounds and of suitable carrier material (for example, Si) there will be precipitated SiC of high purity. ($\varrho = 10^7$–$10^{10}$ ohm centimeters.)

The elongated carrier which is, for example, rodshaped or wirelike or filamentlike, is heated by direct passage of current therethrough or by the action of a high frequency induction zone moving relative thereto.

For direct resistance heating, there is preferably used an arrangement such as described by Van Arkel, which lately has also been used in the production of highly pure silicon.

Most varied forms of carriers are usable in the inductive heating; for example, apparatus has been found well suitable, such as is being applied in the production of silicon for the vertical zone melting under a gas atmosphere. The gas atmosphere, so as to obtain good crystal perfection, may, for example, consist of a mixture of hydrogen or noble gas and an organo-silicon compound and/or of halogen silanes and corresponding hydrocarbon compounds. This mixture is beoynd a certain temperature threshold decomposed, yielding a silicon carbide precipitate. A suitably formed nozzle for the gas supply jointly with correspondingly high flow velocity effect uniformly rapid distribution of the mixture gas in the apparatus.

The various objects, features and details of the invention will appear from the description which will be rendered below with reference to the accompanying drawings, in which:

FIG. 2 shows in diagrammatic manner apparatus for carrying out the method of according to the invention;

FIG. 3 shows part of a rod having doped zones;

FIGS. 3a and 3b show a simplified possibility, proposed by the invention, for obtaining a pn-junction in silicon carbide;

FIG. 4 indicates a carrier made of silicon and provided with a protective layer of silicon carbide; and FIG. 5 illustrates in diagrammatic manner an arrangement for carrying out the separation or precipitation method.

Figure 1A:
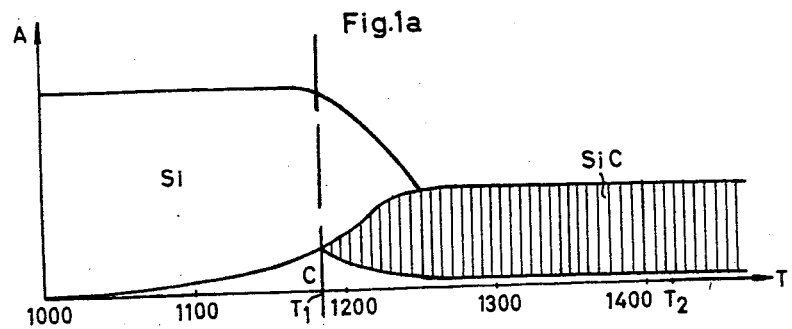
FIGS. 1a to 1c are diagrams explaining for the system silicon-carbon different ratios of silicon to carbon in the initial mixture.
Figure 1B:
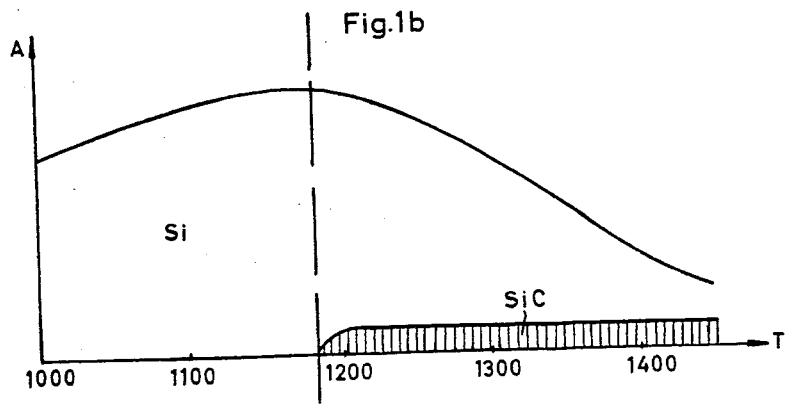
Figure 1C:
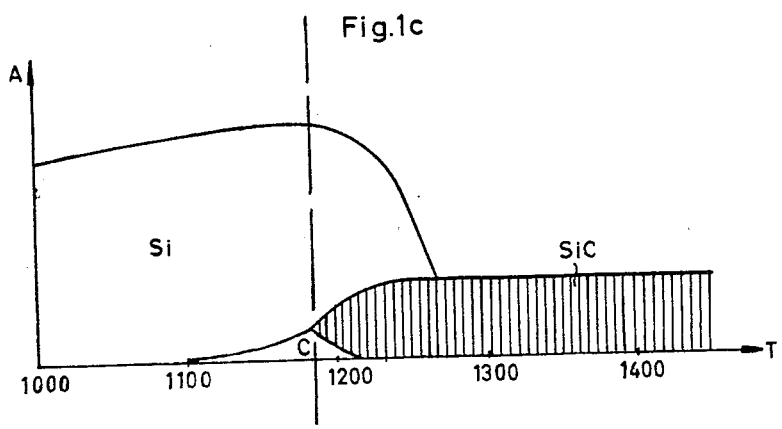

Upon the respective ordinates in FIGS. 1a to 1c are plotted the percentage parts of the individual phases in the total precipitation or separation $A$ and upon the abscissa are plotted the corresponding temperatures $T$.

As will be seen from the diagram FIG. 1a, the formation of the silicon carbide from silicon and carbon sets in at a temperature $T_1$ of about 1150° C. Reference $T_2$ indicates the melting point of the silicon lying at about 1410° C. Within the temperature range delimited by the temperatures $T_1$ and $T_2$ lie the working temperatures at which the silicon carbide is according to the invention precipitated in compact form upon a carrier. These relatively low separation or precipitation temperatures make it possible to use silicon as a carrier material. It will be seen from the diagram that the formation, for example, of carbon-free silicon carbide is effected only within a predetermined ratio range of silicon and carbon in the initial mixture. This ratio must be such that the amount of precipitated silicon is at the working temperature $T$ stoichiometrically equal to that of the carbon. There is beyond this also a stoichiometric dependence of the separated (precipitated or deposited) silicon carbide on the mol ratio of the Si and C compound with reference to the hydrogen (as a carrier gas). In FIG. 1a, the ratio of carbon to silicon in the initial mixture is too high. The separation in the given temperature range is not effected carbon-free.

In FIG. 1b, the ratio of carbon to silicon is too low. The separation is carbon-free, with relatively slight precipitation of silicon carbide and simultaneous precipitation of silicon.

The most favorable ratio of carbon to silicon is apparent from FIG. 1c, being a ratio of silicon to carbon which is, with the use of halogen silanes as, for example, trichlorosilane ($SiHCl_3$) and halogen hydrocarbon substances such, for example, as methylenechloride $$(CH_2Cl_2)$$

about equal to 1. This ratio is already adjusted in the chloridesilane which is together with the carbon compound with hydrogen, introduced into the reaction vessel, reduced at the heated carrier material.

The invention proposes the use of carbon compounds which retain even in vapor phase the ratio predetermined by the mixture thereof in liquid condition with the corresponding silicon compound, for example, trichlorosilane.

Such carbon compounds are in this case, for example, methylenechloride or methylenedichloridesilane $$(CH_3SiHCl_2)$$

A mole ratio of methylenechloride to dichloridesilane, of about 1 has been found advantageous and corresponds to the phase diagram according to FIG. 1c. It is still more favorable to directly decompose organo silicon compounds already containing in their molecular structure a preconditioned atomic ratio Si:C=1:1. Next to methyltrichloridesilane ($CH_3SiCl_3$), methyldichloridesilane $$(CH_3SiHCl_2)$$

owing to its greater thermal instability, has proved particularly suitable.

The thickness of the separated silicon carbide layer depends upon the reaction time above the formation temperature of the silicon carbide and upon the concentration of the initial compounds.

The diagrams shown in FIGS. 1a to 1c also reveal some properties required for the carrier material. Its melting point must exceed the formation temperature of the silicon carbide, that is, it must exceed 1150° C. Moreover, it must not form any silicides which would reduce the melting point to below the formation threshold of the silicon carbide. Materials which satisfy these requirements are, for example, tantalum, tungsten, molybdenum, rhenium, silicon and carbon (graphite).

The thermal coefficient of expansion of the carrier material shall moreover be similar to that of the silicon carbide, so as to avoid upon cooling interior stresses in the crystal grid. Since there always is a slight difference between the thermal coefficients of expansion in the carrier material and the silicon carbide, it will be advantageous and is in accordance with the invention proposed, to surround the precipitated silicon carbide contiguous to the precipitation thereof, in the same reaction space and without appreciably lowering the temperature of the carrier material, with a shell-like protective layer. Silicon, which may be doped if desired, has been found particularly advantageous for this purpose. The shell-like protective silicon layer may be in simple manner precipitated upon the silicon carbide by lowering the carrier temperature to about 1000° C. As will be seen from FIGS. 1a to 1c, practically only silicon will be precipitated at such temperature. The operation is referred to as two-temperature method.

FIG. 2 shows apparatus for practicing the method according to the invention.

In the reaction vessel 1 is disposed the elongated rod-like or wirelike or filament-like carrier 2, made, for example, of silicon, upon which the silicon carbide is to be precipitated. The reaction gas mixture is introduced into the reaction vessel by way of the gas inlet 4. The holding means 5 and 6 for the carrier 2 are disposed in gastight relation by the aid of the schematically indicated sealing sleeves 7 and 8. The heating of the carrier to the separation or precipitation temperature T is in the illustrated embodiment effected by galvanic current passage. The holding means 5 and 6 are provided with current terminals. When using a carrier which is in cold condition non-conductive or only poorly conductive, for example, a carrier made of highly purified silicon, the circuit will extend at the beginning of the operation by way of a high frequency voltage source 12, the alternating voltage of which is much higher than that of the alternating voltage source 13. The conductivity of the silicon increases with increasing heating and the circuit can then be switched to the normal commercial current source 13, for example, by actuation of the switches 10 and 11. The current and therewith the temperature T are regulated inductively by means of a coil 9 without interposing any load.

The carrier may however be heated, for example, inductively, by means of a high frequency coil which may if desired be disposed within the reaction vessel and which is by suitable means moved along the carrier rod or which surrounds the carrier rod throughout its length.

The gaseous atmosphere is, for example, provided by a mixture of hydrogen or noble gas, chloridesilane and methylenechloride with a mol ratio of chloridesilane to methylenechloride of about 1. The residual gases are drawn off by way of the gas outlet 3.

In order to obtain a pn-junction in the silicon carbide, doping substances may, for example, be added to the reaction gas mixture, to effect doping during the growth from the gas phase, as in the case of germanium and silicon. For example, phosphochloride ($PCl_3$), boron bromide ($BBr_3$) or boron chloride ($BCl_3$) may be added directly to the chloridesilane so as to effect the doping from the gas phase. If desired, only the carrier material may be doped or additionally doped.

It is thus possible to use, for example, a carrier of doped silicon as, for example, a silicon rod doped with boron, and to produce a pn-junction by precipitating oppositely doped silicon carbide obtained by adding to the reaction mixture opposite doping impurities, for example, donator impurities. The two-temperature method makes it moreover possible to produce a protective silicon layer or jacket.

FIG. 3 shows part of a rod comprising a carrier 23 consisting of one of the previously indicated favorable materials, upon which had been precipitated, in accordance with the invention, first a p-doped silicon carbide layer 25 and thereupon a n-doped silicon carbide layer 26. Numeral 24 indicates a protective layer or jacket produced, for example by the two-temperature method.

There are various possibilities for producing the pn-junction. In order to obtain a p-doped silicon carbide layer, there may be added boron chloride as a carrier gas to the gas mixture consisting of a silicon compound and a hydrocarbon compound or an organo silicon compound. At temperatures of about 1200° C. and higher, p-doped silicon carbide will then be precipitated. In order to obtain the n-doped silicon carbide layer, the p-doped carrier gas must be displaced by a n-doped gas, for example, phosphor chloride or nitrogen.

FIGS. 3a and 3b show a simple possibility for obtaining in accordance with the invention a pn-junction in silicon carbide. The carrier 27 (FIG. 3a) which is p-doped silicon is heated to about 1200° C. or higher, in an atmosphere of an organic hydrocarbon compound as, for example, methylene chloride ($CH_2Cl_2$) and nitrogen ($N_2$), acting also as a carrier gas. The p-doped silicon of the carrier forms with the carbon from the decomposing hydrocarbon compound a p-doped silicon carbide layer 28. The five valence nitrogen of the carrier gas is operative as donator and there is formed a n-doped silicon carbide surface layer 29.

However, the n-doped surface layer may also be obtained by initially working in a pure chlorine hydrocarbon atmosphere, that is, without doping carrier gas, so as to obtain separation of p-doped silicon carbide. The chlorine hydrocarbon compound is thereupon displaced by a n-doped carrier gas, and heated, so as to obtain formation of the n-doped silicon carbide layer.

The same applies, of course, for a n-doped silicon carrier which is heated in a pure chlorine hydrocarbon atmosphere when a p-doped substance is used as a carrier gas. The result will be a n-doped silicon carbide layer upon the carrier provided with a p-doped surface layer.

FIG. 3b shows part of a rod in which the silicon carbide is according to the invention formed upon a graphite border surface. The rod-shaped or filament shaped carrier 14 of highly pure carbon is prepared prior to the silicon carbide separation, for example, with boron or aluminum, and is thereupon heated to 1200° C. or higher, in an atmosphere of halogen silane, for example, trichlorine silane ($SiHCl_3$) and an addition of donator substance, for example, nitrogen ($N_2$) or phosphor chloride ($PCl_3$), thereby causing precipitation of a layer 15 of p-doped silicon carbide. The carbon of the carrier thereby forms with the silicon of the decomposing halogen silane the correspondingly doped silicon carbide. Owing to the corresponding doping addition to the reaction mixture, there will be formed on the surface oppositely doped silicon carbide. Precipitation of a further contacting or protecting layer of silicon which may be doped if desired, can be effected by reducing the temperature to about 1100° C. It is understood, of course, that the carrier can be prepared with n-doping susbtances and that silicon carbide can be separated in a p-doping atmosphere or that the rod can be after the precipitaiton heated in an oppositely doped atmosphere.

Undoped carriers may be used in the examples described with reference to FIGS. 3a and 3b and undoped silicon carbide may accordingly be precipitated.

The portions 20, 21, 22 of the carrier 23 and the protective layer 24, indicated in FIG. 3, may be etched off to expose part of the embedded silicon carbide layer 19 containing the pn-junction, such etching off being possible owing to the high chemical resistance of the precipitated silicon carbide layer as compared with that of the carrier material and the protective layer. The carrier 23 and the protective layer 24 may be utilized, for example, as electrical terminals for the device. The possibility of a short circuit at the surface of the device which may, for example, be used as a high temperature rectifier, is greatly reduced in the resulting structure.

The carrier 17 shown in FIG. 4 consists, for example, of silicon. A varnish-like very thin silicon carbide layer 18 may be produced by brief heating in a pure chloride hydrocarbon atmosphere, such layer, owing to its high chemical resistance, serving well as a protective layer.

The silicon carbide layer precipitated according to the invention, can be made of a thickness from a few tenths of a millimeter up to a practically desired relatively small thickness, by orienting tests with adjusted duration of the action and concentration of the reaction components in the gas phase. In practicing the invention, compact white silicon carbide cylinders of about 0.1 millimeter wall thickness and a specific conductivity of $10^7$–$10^{10}$ ohms per centimeter have been precipitated upon silicon rods.

The silicon carbide produced according to the invention is notable not only on account of its semiconductor properties but also on account of its resistivity for chemicals, its slight dissolution tendency and its thermal expansion which is approximately comparable to that of molybdenum. These properties favor the use of the silicon carbide in connection with chemical apparatus. It may be noted that previously known shaped bodies made by sintering, for example, crucibles made of sintered silicon carbide, were regrettably porous and gas-permeable. The method according to the invention can also be applied in the production of gas tight protective coatings for electrical and optical devices, for example, optical lenses, as well as for producing corrosion-proof chemical and metallurgical devices especially crucibles for drawing silicon crystals or other semi-conductor crystals from a melt.

Since the silicon carbide produced by the invention is obtained in compact form, there is the possibility of coating any sufficiently heatproof body with silicon carbide. The thickness of the corresponding protective coating may vary as desired. It is on the one hand possible to produce extraordinary thin layers (which are characterized by the appearance of interference colors) and just as possible to produce protective layers or coatings with a thickness of several millimeters up to centimeters.

The protective layers obtained by the method according to the invention are completely free of pores and therefore gastight. It is thus possible, for example, to provide graphite articles, for example, crucibles for chemical and metallurgical purposes, with coatings of silicon carbide which prevent ingress of residual gases or other contaminations from the corresponding apparatus into the material being processed, for example, into a melt. Conversely, owing to this property of the silicon carbide, a poisoning of the corresponding apparatus by a contaminated material being processed, cannot take place; accordingly, to mention an example, a crucible in which a semiconductor melt with strong content of impurities had been processed will be after proper cleaning (etching out contaminated semiconductor residue) ready for treating an extremely pure semiconductor melt.

Further details concerning the corrosion-proof properties and the chemical properties of the silicon carbide can be omitted since they may be found in many textbooks. Attention may however be called to the fact that the highly pure silicon carbide produced according to the invention is also an excellent optical material. It may accordingly be well used as a coating material for optical devices, thereby considerably improving such devices in respect to corrosion proofness and thermal resistivity.

In the method according to the invention, the shaped body to be provided with a protective coating, is to be used as a carrier for the precipitation. The corresponding device is, at the surface which is to be coated, heated to at least 1150° C., for example, 1300° C., in a gas stream of a silicon compound and a hydrocarbon substance or a mixture compound, for example, $CH_3SiHCl_2$ or $CH_3SiCl_3$, together with hydrogen or argon. By holding the precipitation velocity to about 0.2 g./cm.$^2$, which is with properly adjusted flow velocity of the reaction gas at the indicated temperature easily possible, the production of a layer with a thickness of several millimeters will require approximately 1 to 2 hours.

The silicon carbide can be precipitated or deposited upon conductors, for example, molybdenum, tantalum, graphite, also upon semiconductors, for example, sintered silicon carbide (Cesiwid), silicon and, further, upon nonconductors, for example, silicon dioxide ($SiO_2$; $Al_2O_3$).

The silicon carbide, when precipitated on certain carrier materials, for example, molybdenum or tantalum, can be easily separated from the corresponding carriers. The separation can be effected either mechanically or chemically. In the case of other materials, for example, graphite or sintered silicon carbide, the precipitated silicon carbide enters into a firmly adhering bond. This is made use of to make a porous material free of pores and therewith gastight.

The separability of the silicon carbide layer from certain carrier materials is utilized primarily in the production of silicon carbide crucibles. Accordingly, a preferred form of the method according to the invention is concerned wit hthe production of a silicon carbide crucible. For example, a preferably thin walled crucible shaped carrier of molybdenum or tantalum is provided with a layer of silicon carbide precipitated thereon, and the corresponding carrier material is thereupon etched off and/or removed mechanically, leaving the silicon carbide shell to be used as a crucible. The precipitation can be for this purpose be effected by means of an arrangement such as is schematically illustrated in FIG. 5.

Such arrangement comprises a quartz tubing Q which is closed gastight at both ends. The carrier T is held by means of a rod St within an energy concentrator E which concentrates high frequency energy supplied by a high frequency coil Sp on the surface of the carrier T (crucible blank). The profile of the energy concentrator and the position of the crucible shaped carrier T is relative to the energy concentrator such that the carrier crucible T assumes as uniform as possible a surface temperature of, for example, 1300° C. The gas mixture which consists, for example, of $CH_3SiHCl_2$ and hydrogen or argon, is introduced through a nozzle D and the spent reaction gases are drawn off at the outlet A. The reaction gas is conducted against the surface of the heated carrier by one or more nozzles, taking care that it reaches the place at which silicon carbide is to be preferentially precipitated. Other particular details as to the construction of the reaction vessel, the mounting of the crucible blank T, the positioning of the gas inlet and outlet may be determined as desired or required in the use of the invention.

In case the corresponding crucible is to be used for the production of highly pure semiconductor material, the silicon carbide should be precipitated on the inside of the crucible shaped carrier. The reason will be at once apparent when it is considered that the silicon carbide first precipitated upon the carrier contacts the carrier in hot condition, thereby assuming traces of the carrier impurities while further layers precipitating upon the base layer will be increasingly purer.

It will be seen from the foregoing explanations that, in a preferred embodiment of the invention, the carrier, for example, a crucible shaped carrier made of conductive material, which is to be coated with silicon carbide, is by the action of high frequency in a flowing gas atmosphere consisting of $CH_3SiHCl_2$ intermixed with hydrogen or argon, heated to a temperature exceeding 1150° C., for example, 1300° C., the high frequency heating being preferably effected by means of an energy concentrator.

However, if the carrier to be coated consists of electrically non-conductive or poorly conductive, heatproof material, such carrier shall be placed in an atmosphere adapted for the silicon carbide precipitation and heated to the required reaction temperature by radiation or by heat conduction. The carrier to be heated is thereby disposed in the immediate vicinity of a heat source or in heat conducting contact with a heat source, for example, a heater made of temperature proof metal and heated in a high frequency field.

A semiconductor used as a carrier may be heated by a current conducted thereto over suitable electrodes. This manner of heating the carrier is of particular importance when it is desired to provide a semiconductor body for corrosion protection with a thin coating of silicon carbide.

A silicon carbide crucible produced in accordance with the invention is particularly adapted for the melting of highly pure semiconductor substances, including silicon. The corresponding crucible can be used for directly producing semiconductor crystals in accordance with the known Czocharlski method.

Changes may be made within the scope and spirit of the appended claims which define what is believed to be new and desired to have protected by Letters Patent.

We claim:

1. A method of producing highly pure silicon carbide by precipitation thereof from a gaseous phase upon a suitable carrier, comprising causing a mixture of highly pure gaseous silicon compound and hydrocarbon substance to flow past a carrier of pure silicon while maintaining the surface temperature thereof above the formation threshold of silicon carbide (above about 1150° C.) but below the melting point of silicon (about 1430° C.) to cause thermal decomposition of said mixture upon said heated carrier surface and therewith precipitation thereon of said highly pure silicon carbide.

2. A method according to claim 1, wherein the amount of precipitated silicon is substantially equal to that of precipitated carbon.

3. A method according to claim 1, wherein the initial mixture comprises halogen silane and halogen hydrocarbon substances, the ratio of silicon to carbon being in said initial mixture equal to about 1.

4. A method according to claim 1, comprising diluting said initial mixture by the addition of hydrogen and the like.

5. A method according to claim 1, wherein a silicon hydrocarbon is used as a hydrocarbon carrier.

6. A method according to claim 1, wherein said carrier consists of doped silicon, comprising precipitating upon such carrier two successively oppositely doped layers of silicon carbide.

7. A method according to claim 1, wherein said carrier consists of doped silicon, comprising precipitating upon such carrier two successive oppositely doped layers, precipitating upon the outer one of said layers a protective silicon layer, and removing parts of said carrier and said protective layer, respectively.

8. A method according to claim 1, for producing corrosion proof devices for use in chemical and metallurgical processes.

9. A method according to claim 1, wherein said carrier is heated to reaction temperature by radiation.

10. A method according to claim 1, wherein said carrier is held positioned in heat exchange relation relative to a high frequency heated temperature insensitive metallic body.

11. A method according to claim 1, wherein said carrier is heated by passage of current therethrough.

12. A method of producing highly pure silicon carbide by thermal decomposition of a reaction gas mixture containing silicon and carbon, comprising the steps of heating a carrier body of silicon to at least 1150° C., flowing the reaction gas mixture along said heated carrier body to effect thermal decomposition thereof and precipitation of silicon carbide on said carrier body, and thereafter reducing the surface temperature of said carrier body to such extent that the precipitated silicon carbide is surrounded with a firm layer of silicon.

13. A method according to claim 12, wherein the reaction gas mixture contains a gaseous silicon compound and a hydrocarbon compound in highly pure form.

14. A method according to claim 12, wherein the reaction gas mixture contains an organometallic silicon compound as a silicon carrier and as a hydrocarbon carrier.

15. A method of producing a silicon carbide layer, comprising the steps of preparing a silicon carrier with doping substance and heating said prepared carrier to at least 1150° C. in an atmosphere containing a hydrocarbon compound, whereby said atmosphere is thermally decomposed, the carbon of the thermally decomposing hydrocarbon compound forming with the silicon of the carrier a doped surface layer of silicon carbide.

References Cited in the file of this patent

UNITED STATES PATENTS

| | | |
|---|---|---|
| 2,854,364 | Lely | Sept. 30, 1958 |
| 2,918,396 | Hall | Dec. 22, 1959 |
| 3,011,877 | Schweickert et al. | Dec. 5, 1961 |
| 3,030,189 | Schweickert et al. | Apr. 17, 1962 |

OTHER REFERENCES

Derwent Belgian patent reports No. 56A, August 1959; 577, 334, Silicon Carbide Production, published July 31, 1959.

Kendall and Yeo: International Congress of Pure and Applied Chemistry, vol. 1, pages 171–175, London, 1947.

Refractory Hard Metals, Schwarzkopf and Kieffer, The Macmillan Company, New York, 1953, relied on page 61.

Kendall, J. T.: The Journal of Chemical Physics, vol. 21, No. 5, pages 821–827 (May 1953).